United States Patent [19]

White

[11] Patent Number: 5,824,405
[45] Date of Patent: Oct. 20, 1998

[54] BARRIER MEMBRANE FOR PROTECTIVE CLOTHING

[75] Inventor: Lloyd Steven White, Columbia, Md.

[73] Assignee: W. R. Grace & Co.-Conn., New York, N.Y.

[21] Appl. No.: 659,806

[22] Filed: Jun. 7, 1996

[51] Int. Cl.$^6$ ........................................................ B32B 7/00
[52] U.S. Cl. ........................ 428/304.4; 428/85; 442/224; 442/261; 442/292
[58] Field of Search ..................................... 442/261, 292, 442/224; 428/85, 304.4

[56] References Cited

U.S. PATENT DOCUMENTS

| | | | |
|---|---|---|---|
| 4,194,041 | 3/1980 | Gore et al. | 428/315 |
| 4,469,744 | 9/1984 | Grot et al. | 428/246 |
| 4,515,761 | 5/1985 | Poltzker | 423/240 |
| 4,518,650 | 5/1985 | Grot et al. | 428/286 |
| 4,943,475 | 7/1990 | Baker et al. | 428/246 |
| 5,178,940 | 1/1993 | Matsumoto et al. | 428/304.4 |
| 5,260,360 | 11/1993 | Mrozinski et al. | 524/95 |
| 5,264,166 | 11/1993 | White et al. | 264/4 |
| 5,273,814 | 12/1993 | Kelly | 428/244 |

*Primary Examiner*—Ana Woodward
*Attorney, Agent, or Firm*—Howard J. Troffkin

[57] ABSTRACT

A polyimide gas separation membrane can be used to make protective cloth having good water vapor breathability as well as good resistance to permeation by noxious gases and penetration by liquid water.

15 Claims, No Drawings

BARRIER MEMBRANE FOR PROTECTIVE CLOTHING

FIELD OF THE INVENTION

The invention generally relates to a barrier membrane for use in protective clothing. The barrier membrane, made of polyimide, has a very limited permeability to organic vapors, and is impermeable to liquid water, but has substantial permeability to water vapor. The membrane can be interlaid between two fabric layers to provide a cloth that has the desired permeability characteristics, and is also soft, light weight, flame resistant, flexible, and pleasant to touch. The cloth can be manufactured into garments that provide protection from liquid water and yet are wearable for extended periods of time.

BACKGROUND OF THE INVENTION

Various types of clothing have been proposed from time to time to reduce the risks of those workers who must be exposed to noxious materials such as contaminated water, dust, and chemical fumes. While it is not difficult to provide adequate levels of protection from noxious materials, the clothing or devices proposed thus far tend to be heavy, hot, or cumbersome. As a result, worker compliance with safety regulations can be difficult to obtain. In the alternative, some safety clothing may introduce new risks into a situation, for example, when the ambient temperature is high. In that case, a worker may be well-protected from splashes and spills, but run the risk of overheating.

A useful cloth for making protective clothing should be "breathable". That is, the cloth should be highly permeable to water vapor, or have a high rate of water vapor transmission. Further, the surface of the cloth should be pleasant to the touch. In practical terms, the surface should be dry, non-tacky, and textured. Further, the cloth should be flexible, soft, reasonably thin, and light. All of these factors affect the comfort of the wearer, and help ensure that the protective clothing will be wearable. In addition, the cloth should also be impermeable to most liquids, including water and organic solvents. It should be resistant to attack by acids, bases, and common organic solvents. And it should be flame resistant. Many materials have been found that maximize one or a few of the listed characteristics, but obtaining all of them in the same garment is difficult.

Rubberized fabrics, for example, are well known to be water repellent, and have been used, for example as raincoats. However, the rubberized fabric is not breathable. A similar result is obtained with other types of polyolefin coatings. Other types of coatings for fabrics may repel water but have no effect on organic vapors, and are affected by solvents. Recently, there have been some attempts to incorporate new materials into clothing, however, the result is not especially well adapted for protection from both infectious agents and chemical agents.

Membrane materials known for high water vapor transmission rates have been studied for use in protective clothing. See U.S. Pat. Nos. 4,518,650 issued to Grot et al. May 21, 1985; 4,515,761 issued to Plotzger May 7, 1985; and 4,496,744 issued to Grot et al. Sep. 4, 1984, all of which disclose highly fluorinated ion exchange polymer films or membranes as a layer in a protective garment. These materials swell upon exposure to moisture, and therefore are dimensionally unstable.

Also, a microporous membrane layer has been shown to have good water repellency and still be highly permeable to moisture vapor and air. U.S. Pat. No. 4,194,041 issued to Gore et al. Mar. 18, 1980, describes waterproof articles with microporous PTFE or polypropylene. U.S. Pat. No. 5,260,360 issued to Mrozinski et al. Nov. 9, 1993, describes a microporous membrane material of an olefin polymer and a fluorochemical oxazolidinone compound. However, since the pores of these membranes are generally greater than 100 nm (0.1 micron) they do not provide protection against chemical agents.

Various silicone composites are known to have good resistance to flame, good water repellancy and good permeability to moisture vapor, but they also have a high rate of transmission of organic vapors.

Multilayer thin film composites have also been explored for this purpose, but were not found to meet all the target properties, see U.S. Pat. No. 4,943,475 issued to Baker et al. Jul. 24, 1990.

Other cloths with some barrier properties to chemical agents are laminates containing adsorbent materials, see U.S. Pat. No. 5,273,814 issued to Kelley Dec. 28, 1993. These depend upon the affinity of chemical agents to the carbon and have limited adsorptive capacity. Since these materials adsorb chemical agents, they also may present a disposal problem.

Cellulosic materials are known to be useful to make gas and liquid separation membranes. These materials, however, have proven to be highly flammable.

SUMMARY OF THE INVENTION

It is an object of the present invention to provide a cloth for making protective clothing that is both wearable and highly protective. Another object of this invention is to provide a cloth that is highly permeable to carbon dioxide and water vapor, yet is impermeable to liquid water, liquid organic solvents, and organic vapors. Yet another object of this invention is to provide a cloth with highly desirable permeability characteristics that is also heat resistant, non-flammable, crease resistant, flexible, lightweight and soft.

An advantage of the invention is that the cloth can be used to make garments that have a look and feel much like ordinary clothing, and yet provide significant protection from chemical spills and splashes, as well as infectious agents and noxious vapors. Further objects and advantages of the invention will be apparent from the disclosure and examples herein.

The objects and advantages of this invention are obtained by laminating together an outer fabric, a polyimide gas separation membrane, and an inner lining. The polyimide membrane gives the cloth barrier new properties and makes it useful in protective clothing. Specifically, the laminated cloth provides a shield against liquid water and chemical vapors or liquids while demonstrating good rates of water vapor transmission. The outer fabric and inner lining provide the texture and appearance of ordinary clothing.

The polyimide membrane of this invention is an asymmetric gas separation membrane having an ultrathin gas separation surface. It can be prepared by a known method of mixing a casting dope containing a polyimide polymer dissolved in a mixture of solvents and non solvents, spreading the dope as a film upon a support fabric, and quenching the membrane into water to initiate a phase inversion process. The membrane should be cast so as to prepare a thin, porous structure, preferably less then 2 mils in thickness. The formed membrane structure is then washed to remove the solvents and non-solvents. After washing the membrane is dried in air. The finished material is flexible and contains an asymmetric polyimide membrane structure.

Methods of making asymmetric polyimide gas separation membranes are disclosed in U.S. Pat. No. 5,264,166 issued Nov. 23, 1993 to White et al., which is incorporated by reference herein as if set forth in full.

The active membrane surface is then laminated with an adhesive to another fabric. This yields a final multi-layer structure of support fabric, membrane layer, adhesive and second fabric.

In a preferred embodiment, the support fabric ultimately serves as the inner surface of the cloth, the adhesive layer is effectively contiguous with the active membrane surface, and the second fabric serves as the outer surface of the cloth. This protective cloth can then be fashioned into protective garments. In another embodiment, the support fabric and membrane layer may be used to fashion the outer shell of a garment, and a second fabric sewn or adhered to the outer shell in any manner known to the tailor's art. In yet another embodiment, the support fabric and membrane layer may be used to make the lining of a garment.

Alternatively, the membrane can be cast as an unbacked membrane by spreading the dope upon a support film or surface. This membrane is then delaminated from the support as an unsupported film and adhesively fastened to both an outer fabric and an inner lining to give the final product.

The preferred materials for use in this invention are polyimides having superior solvent resistance, high permeability to water vapor, and strong rejection of organic vapors. One such material that is commercially available is Lenzing P84 polyimide available from Lenzing Performance Inc. of Lowland, Tenn. The CAS name is 5,5'-carbonylbis[1,3-isobenzofurandione], polymer with 2,4-diisocyanato-1-methylbenzene and 1,1'-methylenebis[4-isocyanatobenzene] (CAS Registry No. 58698-66-1).

The solvents and non-solvents are chosen for the ability to form an asymmetric membrane structure upon quench of the polyimide dope solution into a water bath.

The preferred membrane structure is ultrathin and without macrovoids or fingers that might lead to defects. In this instance, ultrathin means that the separating surface of the membrane preferably has a thickness of about 2 mils, and even more preferably less than 1 mil. The separating surface needs to be thin in order to optimize efficiency of water vapor transport as well as the flexibility of the final product. The membrane needs to be asymmetric to provide a porous support that lends physical strength to the separation layer without reducing the rates of gas transmission rate for the desired gas (water vapor). The inventor has found that use of woven fabrics is preferred over the use of non-wovens to enhance the flexibility of the finished laminated cloth.

The fabrics used to form the laminate structure control the flexibility, feel, and appearance of the finished barrier cloth but not the permeation properties. The fabrics also protect the membrane from abrasion and tears. Some of the preferred fabrics are woven cloths made from Nomex® fiber. Nomex® is an aramid fiber made by DuPont (Wilmington, Del.) with good temperature and chemical resistance. Nylons, cottons, polyesters, and other fibers can also be used in the fabrics.

In concept, any of the adhesives commonly used to laminate polymer film and fabric layers together may be used. A spray adhesive from 3M (St. Paul, Minn.) was used in these experiments to attach the fabrics together. The adhesive must be easy to apply and provide an adequate bond between the layers without causing excessive increase in the bulk and stiffness of the product.

The final product is a cloth with high barrier to liquids and organic vapors, and high transmission rate for water vapor. Good water vapor transmission rates are especially important since this feature provides additional comfort in hot environments by allowing sweat to evaporate. This is an important aspect of this polyimide containing cloth since it can breath water vapor while maintaining barrier properties. Polyimides can also provide properties of good high temperature resistance and low flammability.

DETAILED DESCRIPTION OF THE INVENTION

A gas separation membrane useable in the present invention can be made in the following manner. A polyimide polymer dope solution is prepared by dissolving the fully imidized polyimide polymer based on is 5,5'-carbonylbis[1,3-isobenzofurandione], polymer with 2,4-diisocyanato-1-methylbenzene and 1,1'-methylenebis[4-isocyanatobenzene] in one or a mixture of the following water-miscible solvents: N-methyl-2-pyrrolidone, hereinafter referred to as NMP, tetrahydrofuran, hereinafter referred to as THF, N,N-dimethylformamide, hereinafter referred to as DMF, dioxane, γ-butyrolactone, water, alcohols, ketones, and formamide. Another suitable polymer is Matrimid 5218 available from Ciba Geigy which is the fully imidized polymer based on 5(6)-amino-1-(4'-aminophenyl)-1, 3,3-trimethylindane and benzophenone tetracarboxylic dianhydride.

The weight percent of the polyimide polymer in solution may range from 10 to 35% in the broadest sense, although a 15 to 30% range is preferable and a 20 to 28% range is most preferred.

Viscosity enhancing additives may be present in amounts up to 3% by weight of the polyimide polymer dope solution. These include polyvinyl pyrrolidones, polyethylene glycols and urethanes. Additionally, void suppressers may be used in amounts up to 5% of the weight of the polyimide polymer dope solution. Water, maleic acid, and other small molecules produce the desired results.

Once the polyimide polymer is dissolved in the solvent system described, it is cast onto a substrate and a portion of the solvent may be evaporated under conditions sufficient to produce a thin, dense skin on the polyimide membrane. Typical evaporation conditions adequate for this purpose include air blown over the membrane surface at 15° to 25° C. for a duration of less than 30 seconds.

The coagulating or quenching medium may consist of water, alcohol, ketones or mixtures thereof, as well as additives such as surfactants, e.g.,. Triton X-100® octylphenoxy-polyethoxyethanol, available from Aldrich Chemical Company, Milwaukee, Wis. The conditions for effecting coagulation are conventional.

The asymmetric polyimide membranes of the present invention can be washed and dried according to the following techniques. Typically a water-soluble organic compound such as low molecular weight alcohols and ketones including but not limited to methanol, ethanol, isopropanol, acetone, methylethyl ketone or mixtures thereof and blends with water can be used for removing the residual casting solvent (e.g., NMP) from the membrane. Alternatively the membrane may be washed with water. Removal of the residual casting solvent may require successive wash blends in a sequential solvent exchange process. Both membrane efficiency and flow rate can be enhanced by the proper solvent exchange process.

Once the membrane is formed it may be processed into a flat sheet configuration suitable for use in an article of clothing.

The dense ultra-thin separating surface, or "skin" layer of the invention's asymmetric polyimide membrane is characterized by a pore sizes below 50 Å in diameter, is highly resistant to both water and organic solvents, and has a high separating efficiency. Separating efficiency in this context is viewed as a balance between the high transmission rate for the gases needed to give the garment breathability and the very low transmission rate for undesirable gases.

For breathability, the gas transmission rate for water vapor (WVTR) should be at least about 500 g/m²/day, and more preferably above 1000 g/m²/day at 50% humidity. These values will increase and decrease with changes in humidity and temperature. These values for WVTR can be measured by a cup method described in ASTM E96-90 on Standard Test Methods for Water Vapor Transmission of Materials. Under actual use conditions a barrier membrane which is contained in a suit is likely to experience warm and humid conditions due to the exertions of the occupant.

For the purposes of testing the capabilities of the membrane in this application, undesired gases are represented by hexane and isopropanol. Human beings are relatively tolerant of gaseous hexane and isopropanol (in the physiological sense), and so these gases do not, generally speaking, present much of an exposure danger in most circumstances. These gases are, however, well known, readily available, aggressive solvents, and among the smallest molecules of their class. Since the membrane separates gases in part by molecular size, high rates of rejection for these gases gives a strong indication that other gases, known to be noxious and have larger molecules, will have even higher rates of rejection.

The gas transmission rate through the membrane for any given volatile compound depends on the the compound's vapor pressure under the experimental conditions. The operating temperature and concentration in the gas mixture being analyzed are particularly important. In order to account for differences in the compound's vapor pressure under different conditions, a resistance value for the barrier can be determined. The resistance of a barrier fabric (in units of seconds/meter) is calculated from the slope of the plot of the log mean concentration difference (kg/m³) versus the flux per unit area (kg/m²/sec). In the cup method, this log mean concentration difference is simply the vapor pressure difference across the membrane since the different atmospheres on each side of the film are presumed to be homogeneous, or well mixed. A large value for resistance indicates better barrier properties. A fabric with a WVTR of better than 500 g/m²/day at room temperature and 50% humidity would have a resistance of less than 1400 s/m. A preferred fabric a WVTR of better than 1000 g/m²/day and would have a resistance of less than 700 s/m for water vapor by the cup method. Preferred resistances to organic vapors are much higher. For example, with a saturated atmosphere of hexane vapor the membrane resistance should be at least 10,000 s/m, and preferably better than 50,000 s/m.

The following examples illustrate the use of the present invention, however, they do not limit the invention, or the scope of the claims which follow.

COMPARATIVE EXAMPLE 1

A cellulosic dehydration membrane with WVTR of 1200 g/m²/day at 50% humidity and 24° C. was held near a lighted match. The coating instantly ignited and burned readily. The same cellulosic membrane was exposed to a drop of liquid carbon tetrachloride. The membrane structure visibly collapsed. A sample of unsupported film made from Lenzig P84 polyimide according to the present invention was held to the flame of a match. The film melted and charred upon continued exposure, but did not ignite. A drop of carbon tetrachloride placed on the polyimide film evaporated from the surface with no damage to the membrane.

EXAMPLE 1

A viscous solution containing 22% Lenzing P84 polyimide, 67% dioxane, and 11% DMF was prepared and filtered through a 10 micron filter. This solution was cast at 4 ft/min onto a moving web of woven nylon fabric using a knife blade set at a gap of 4 mil above the fabric. After 4.0 seconds the coated fabric was quenched in water at 24° C. to form the membrane structure. The membrane was washed with water to remove residual solvents and air dried to produce a barrier cloth with a polymer coating of 1.1 oz/yd² and a total weight of 2.9 oz/yd².

Permeability measurements were made by following the Water Method of ASTM E96-90 on Standard Test Methods for Water Vapor Transmission of Materials. The membrane samples were adhesively sealed face down to a jar containing liquid and a surface area of 50 cm². The measurements were determined at 50% relative humidity, 24° C., and an air velocity over the surface of the jar of 0.8 m/sec. The appropriate liquids were substituted for determining vapor transmission rates of chemicals other than water. The 0.1 micron pore size Nytran® membrane filter (Schleicher & Schuell Inc., Keene, N.H.) was tested as an example of a microporous membrane structure.

TABLE 1

| Vapor Transmission Rates (g/m²/24 hr) | | | |
|---|---|---|---|
| | water | hexane | isopropanol |
| Lenzing Barrier | 930 | 150 | <30 |
| 0.1 micron Nytran | 1100 | 6400 | 1360 |

The polyimide membrane has water vapor transmission rate comparable to the microporous membrane, yet also has substantial barrier properties to vapors from organic chemical compounds. There was a 43-fold improvement with hexane when compared with the microporous structure and greater than 45 fold improvement with isopropanol in terms of barrier properties.

The polyimide membrane was also tested for waterproof properties by subjecting the membrane to liquid water under pressure. At pressures as high as 50 psi no water flow was observed through the membrane.

A composite fabric was made with the polyimide membrane. Nomex®III, a knit polyaramid fabric with a weight of 4.2 oz/yd² and thickness of 10 ml, was coated with "Super 77" spray adhesive (commercially available from 3M company). The separating surface of the polyimide membrane was then adhered to the Nomex®III fabric to give a composite fabric structure with an overall thickness of 17 mil and a weight of 7.4 oz/yd². The composite product had a weight, thickness and flexibility similar to cotton canvas, and was lighter, thinner, and about the same flexibility as new denim. The polyimide membrane can be laminated to a wide variety of other fabrics to change thickness and feel of the composite product. This composite sample demonstrated a water permeability of 700 g/m²/day and a hexane permeability of 177 g/m²/day.

EXAMPLE 2

A viscous solution containing 22% Lenzing P84 polyimide, 67% dioxane, and 11% dimethylformamide was prepared by mixing in a jar and leaving on a roller. This solution was cast at 2 ft/min onto a moving web of 2 mil thick polypropylene. The knife blade was set at a gap of 2 mil above the web. After 8.1 seconds the coated film was quenched in water at 22° C. to form the membrane structure. The membrane was washed with water to remove residual solvents and then delaminated from the polypropylene as an unsupported film. This membrane was rinsed in isopropanol (IPA) and then air dried.

A blue Supplex nylon cloth available from a local fabric store was cut to size, lightly sprayed with 3M "Super77" adhesive, and after one minute pressed against the active face of the membrane. The nylon/Lenzing P84 polymer structure was turned over, and the adhesive was sprayed upon a section of nylon fabric from Texlon Corporation (Torrance, Calif.). After one minute this was laminated to the back side of the membrane. The edges were trimmed to give a final barrier fabric. The material had good flexibility. That is, it had a flexibility of 2.08 lbs. as tested according to ASTM D4032-82, and was somewhat more flexible than the material made in Example 1. Test results are in Table 2.

TABLE 2

Test Results for Barrier Fabric in Example 2

| Property | Comments | Value | Resistance |
|---|---|---|---|
| Thickness | Fabric composite | 13 mil | |
| Thickness | Membrane film alone | 0.7 mil | |
| Weight | Fabric composite | 5.3 oz/yd$^2$ | |
| Weight | Membrane film alone | 0.4 oz/yd$^2$ | |
| Flexibility (see ASTM D4032-820 | CIrcular bend test method (back-to-back) for composite | 2.08 lbs | |
| WVTR | Cup method @ 50% humidity and 21° C. | 1300 g/m$^2$/day | 609 s/m |
| WVTR | Cup method @ 50% humidity and 32° C. | 2500 g/m$^2$/day | 584 s/m |
| Hexane permeability (100% vapor pressure) | Cup method @ 21° C. | 700 g/m$^2$/day | 72500 s/m |

EXAMPLE 3

An unsupported film was prepared from a dope consisting of 26% Matrimid 5218 polyimide (Ciba Geigy), 15% acetone, and 59% dimethylformamide by casting upon a glass surface with a 2 mil gap and quenching after 15 seconds in a 20° C. water bath. The membrane delaminated from the glass surface after it formed and was soaked in water to remove additional solvent. The unsupported membrane was rinsed in IPA, and then air dried. A composite fabric was then prepared using the methods of Example 2 to give a nylon/Matrimid/Texlon structure. Overall weight for this fabric was 5.5 oz/yd$^2$.

COMPARATIVE EXAMPLE 2

A 1 mil thick sheet of microporous polypropylene (Celgard 2400 from Celanese Corp.) was laminated between two fabric layers using the methods of Example 2 to give a nylon/Celgard/Texlon structure. Overall weight for this fabric was 5.3 oz/yd$^2$. Vapor transmission rates were measured by the cup method for water and hexane, and the resistances calculated and listed in Table 3. One can readily see that polyimide containing membrane samples have superior barrier properties to organic vapors compared to the microporous film.

TABLE 3

Resistance of Fabrics to Vapors by the Cup Method

| Sample | Liquid | Temp. (°C.) | Rate @ 50% humidity (g/m$^2$/day) | Resistance (s/m) | Ratio of resistances (hexane/water) |
|---|---|---|---|---|---|
| Comparative Example 2 | water | 18 | 1300 | 516 | 5.6 |
| | hexane | 15600 | 2893 | | |
| Example 2 | water | 21 | 1300 | 609 | 119 |
| | hexane | 21 | 700 | 72500 | |
| Example 3 | water | 22 | 1350 | 620 | 23 |
| | hexane | 22 | 3680 | 14418 | |

What is claimed is:

1. An article of protective cloth having a water vapor rate of transmission of at least 500 g/m$^2$/day and a hexane vapor resistance of greater than 10,000 s/m, the article composed of a plurality of layers wherein the outer layers are composed of fabric and at least one inner layer is composed of a flexible, porous film formed of an asymmetric gas separation membrane which comprises a polyimide.

2. The article of claim 1, wherein the polyimide is a polymer formed from 5,5'-carbonylbis(1,3-isobenzofurandione); 2,4-diisocyanato-1-methylbenzene; and 1,1'-methylenebis(4-isocyanotabenzene).

3. The article of claim 1, wherein the polyimide is a fully imidized polyimide based on 5(6)-amino-1-(4'-aminophenyl)-1,3,3-trimethylindane and benzophenone tetracarboxylic dianhydride.

4. The article of claim 1, wherein the membrane is a film less than 2 mil thick.

5. The article of claim 1, wherein at least one of said fabric layers is selected from the group consisting of nylons, polyesters, cottons, and polyaramids.

6. The article of claim 5 wherein the multi-layer cloth is composed of a first layer of fabric, a second layer of fabric, and the gas separation layer is located between said first layer and said second layer.

7. The article of claim 6, wherein the gas separation layer is at least partially adhered to a layer of fabric.

8. The article of claim 7, further comprising one or more adhesives.

9. The article of claim 1, having a gas transmission rate for water vapor of at least 1000 g/m$^2$/day at 50% humidity.

10. The article of claim 1, having a water vapor resistance of less than 1400 s/m.

11. The article of claim 10, having a water vapor resistance of less than 700 s/m.

12. The article of claim 1, having a hexane vapor resistance of greater than 10,000 s/m.

13. The article of claim 12, having a hexane vapor resistance of greater than 50,000 s/m.

14. The article of claim 1, having the ratio of resistance to organic vapors compared to the resistance to water vapor of 10 or more.

15. The article of claim 1, 2, 3, 4, 5, 6, 7, 8, 9, 10, 11, 12, 13 or 14 wherein the polyimide membrane is initially formed as an unbacked membrane which is subsequently used as at least one inner layer of the article.

* * * * *

UNITED STATES PATENT AND TRADEMARK OFFICE
CERTIFICATE OF CORRECTION

PATENT NO.  : 5,824,405
DATED       : October 20, 1998
INVENTOR(S) : WHITE

It is certified that error appears in the above-indentified patent and that said Letters Patent is hereby corrected as shown below:

In Claim 2, at line 3 delete "1,1'-methylenebis(4-isocyanotabenzene)" and insert in lieu thereof --1,1'-methylenebis(4-isocyanatobenzene)--.

Signed and Sealed this

Third Day of April, 2001

Attest:

NICHOLAS P. GODICI

*Attesting Officer*    *Acting Director of the United States Patent and Trademark Office*